May 6, 1924.
B. E. BALDUF
1,493,013
PAPER CUTTING MACHINE
Filed April 3, 1920   2 Sheets-Sheet 1
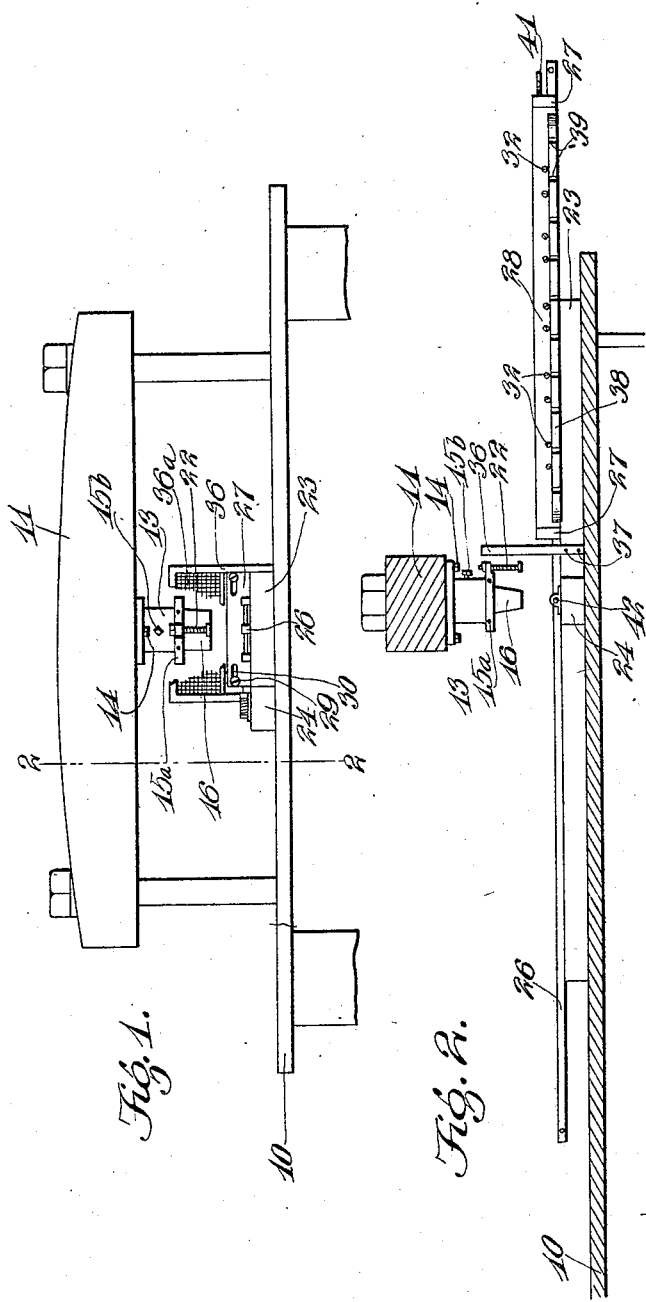
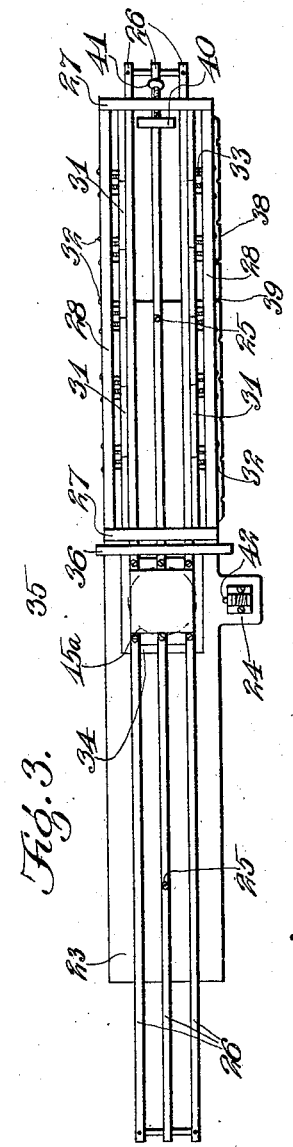
Bruno E. Balduf
INVENTOR.
BY
ATTORNEYS.

May 6, 1924.
B. E. BALDUF
PAPER CUTTING MACHINE
Filed April 3, 1920 2 Sheets-Sheet 2
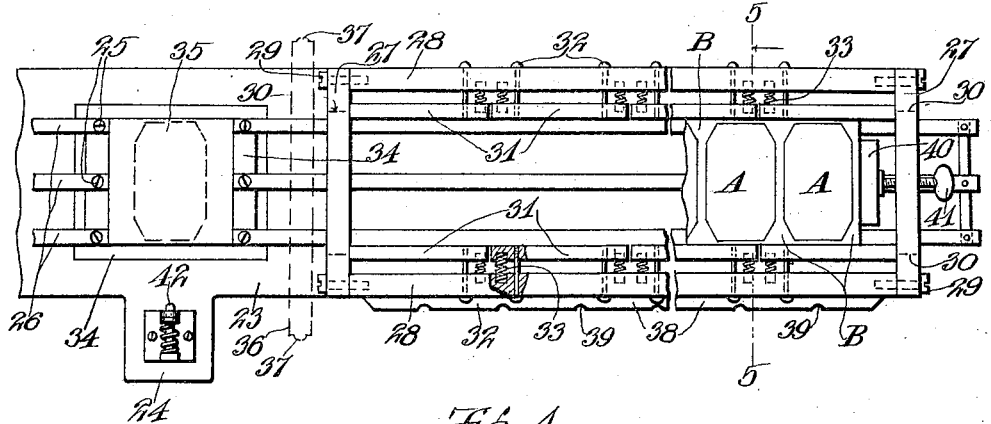
Fig. 4.
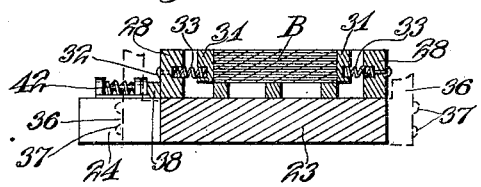
Fig. 5.
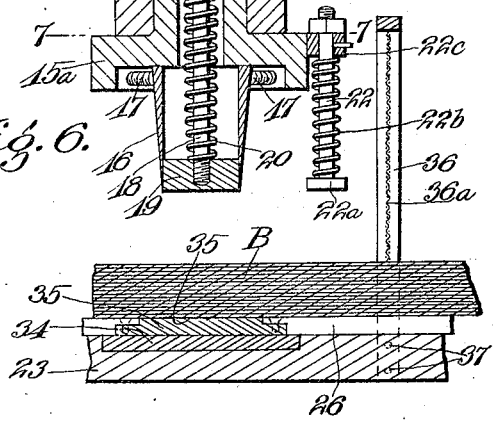
Fig. 6.
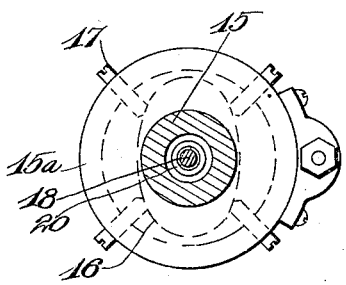
Fig. 7.
Bruno E. Balduf
INVENTOR.
BY
ATTORNEYS.

Patented May 6, 1924.

1,493,013

UNITED STATES PATENT OFFICE.

BRUNO E. BALDUF, OF CHICAGO, ILLINOIS, ASSIGNOR TO UNITED STATES ENVELOPE COMPANY, OF SPRINGFIELD, MASSACHUSETTS, A CORPORATION OF MAINE.

PAPER-CUTTING MACHINE.

Application filed April 3, 1920. Serial No. 371,106.

*To all whom it may concern:*

Be it known that I, BRUNO E. BALDUF, a citizen of the United States, residing at Chicago, in the county of Cook and State of Illinois, have invented new and useful Improvements in Paper-Cutting Machines, of which the following is a specification.

The machine which is the subject matter of the present application for patent has been designed to cut a stack of paper strips into small pieces of uniform dimensions. The machine is especially useful for cutting a long strip of paper into labels, it being understood that the strip contains a number of impressions of the printed matter of the label, and the strip being cut at the proper places and thus divided into a number of complete labels.

In a machine of the kind stated it is important that the printed strip be cut accurately, and the invention therefore has for its object to accomplish this result by a simple and efficient means.

The invention also has for its object to provide a novel and improved feeding means for the work.

The objects stated are attained by means of a combination and arrangement of parts to be hereinafter described and claimed, and in order that the same may be better understood, reference is had to the accompanying drawings forming a part of this specification.

In the drawings Figure 1 is a front elevation of the machine; Fig. 2 is a vertical section on the line 2—2 of Fig. 1; Fig. 3 is a plan view of the machine minus a cutting die and other parts associated therewith; Fig. 4 is a view similar to Fig. 1 drawn to an enlarged scale and partly broken away; Fig. 5 is a cross-section on the line 5—5 of Fig. 4; Fig. 6 is a sectional view of the cutting die and certain parts associated therewith, and Fig. 7 is a horizontal section on the line 7—7 of Fig. 6.

Referring specifically to the drawings, 10 denotes a machine bedplate above which is located a vertically reciprocatory cross-head 11 operated by the standard methods. A chuck 13 is bolted or otherwise fastened to the bottom of the cross head, as shown at 14, and is adapted to hold the shank 15 of a die holder 15$^a$, said shank being secured by a set screw or other suitable means 15$^b$. The holder 15$^a$ is dimensioned to suit the size of the cutting die 16 used, the latter being shown as oval in outline. See dotted lines in Fig. 7. The die therefore cuts oval labels A from the stack of sheets B shown in Fig. 4. It will be understood, of course, that dies of other shapes may be employed according to the desired shape of the labels. The die is clamped to the holder by radial screws 17.

The design of the die holders 15$^a$ corresponds to the dimensions of the various dies 16 to be used with the machine, and the stem 15 only is made of standard diameter, so as to enable the stems of all the die holders to be fitted in the chuck 13.

In the center of the die holder 15$^a$ is hung axially a stem 18 carrying a stripper plate 19 at the bottom. A spring 20 coiled around the stem 18 and pressing down against the stripper plate, normally holds it advanced. When the die 16 is making a cut, the stripper plate is forced upwardly against the tension of its spring, and as the die rises, the stripper plate is forced down to strip the work off the die. The stem 15 has a bore 21 in which the stem 18 works.

At one side of the die 16 is located a vertical plunger stem 22 having a head 22$^a$ at its lower end. This stem is free to slide vertically, and it is forced downwardly by a spring 22$^b$. The stem 22 is carried by a support 22$^c$ fastened to the side of the die holder 15$^a$. It will therefore be seen that the stem reciprocates with the die 16, and it is also free to yield upwardly.

When the die 16 descends on the stack of sheets B to cut the labels A therefrom, the stripper 19 and the plunger head 22$^a$ follow and press down on top of the stack, and when the die rises, the labels are stripped off the die, whereas the plunger head remains pressed down on the uncut portion of the stack to hold the same down and prevent it from following the die. As the die continues to rise and clear the stack, the plunger head also ascends and leaves the stack. The stack is then advanced a distance corresponding to the width of the labels, and another cut is made, and so on until the entire stack has been divided or cut up to form the labels.

The stack of sheets B is carried by a feed device which will now be described.

On the bed plate 10 is fastened down a base board 23 having an offset 24 at one of its side edges. On this base board are secured by screws or other means 25 three rails 26 which slidably support a work supporting carriage 27 having its sides 28 secured to the ends by screws 29 passing through slots 30 to make the spacing of its sides adjustable, and thus enable the width of the carriage to be varied. Each side piece 28 carries on the inside a plurality of alined strips 31, each of which strips is held to the side piece by two screws 32 which pass slidably through the latter, the screw heads being on the outside. The strip sections are kept spaced from the side pieces by coiled springs 33 lodging at their ends in cavities drilled in said spaced parts. The strip sections act as resilient clamping jaws for the stack of sheets B laid in the carriage frame, and as the stack is cut into stacks A of labels, those strip sections opposite the labels being cut yield to the lateral pressure of the die as it descends and crowds the stock from which the labels are cut outwardly. The balance of the strip sections 31 continue to hold the remaining portion of the paper stack, however, so that the latter may not be shaken loose on the forward or feed stroke of the carriage to position the stack B under the die 16 for the next cut; and with the assistance of the plunger stem 22 the said strip sections serve to hold the stack firmly during the cutting stroke so as to prevent the shifting or spreading of the sheets. The labels are therefore cut with a uniform outline or margin.

On the base board 23, beneath the die 16, is an anvil plate 34 to receive the thrust of the die, and fitted with a top brass plate 35, which serves to cushion the impact thereof. In front of the anvil plate is an upright frame 36 fitted with a wire netting 36ª, and serving as a guard to prevent the operator from getting the hand into the path of the die. The guard is cut away at the bottom to permit the carriage 27 to pass, and its legs are fastened to the base board 23 as shown at 37.

The carriage 27 is advanced preferably by hand, with a series of short strokes, each forward movement corresponding to the width of the labels to be cut. In order that the operator may move the carriage the exact distance required, a gage device is provided. This device is a strip 38 mounted on one of the side edges of the carriage 27 and having a series of uniformly spaced edge notches 39, the spacing of said notches conforming to the width of the labels. The stack of sheets B is laid on the carriage against a head 40 on the rear end thereof, and said head is adjusted by a hand screw 41 until printed portions of the sheets comprising the label sections properly register with the notches 39. The base offset 24 carries a spring pressed latch pin 42 positioned to coincide with the center of the anvil plate 35, and as a notch 39 comes opposite a pin 42, the latter snaps into the notch, serving to hold the carriage while a cut is being taken. The carriage is then advanced until the pin snaps into the next notch, and so on until the entire batch of sheets B has been cut into labels A. The waste stock and labels are now loose within the carriage, and the latter may be lifted off, leaving the waste stock and labels on the rails 26 to be separated and removed.

The carriage 27 can be used for label sheets narrower than those shown, by simply setting the side pieces closer together after loosening the screws 29.

The machine is very simple in operation, and it is also rapid so that by its use the expense of cutting paper strips into labels or the like is materially reduced. The machine can also be used for cutting envelope blanks and other articles from paper strips.

I claim:

1. A machine for severing a plurality of pieces from a stack of blanks, comprising a reciprocatory cutting die, a spring pressed stripper movable within the die, and a spring-actuated presser member movable with the die to engage the blanks and adapted to hold the blanks until after the die has cleared the blanks on its return stroke and the stripper has left the cut pieces within the stack.

2. In a machine of the class described, the combination with a base and a work supporting carriage longitudinally movable thereon, of means carried by said base and said carriage, respectively, for opposing further movement of said carriage each time the latter is moved a predetermined amount on said base.

3. In a machine of the class described, the combination with a base and a work supporting carriage longitudinally movable thereon, of means consisting of coacting, projecting and recessed portions provided on said base and said carriage for opposing movement of said carriage each time the latter is moved a predetermined amount on said base.

4. In a machine of the class described, the combination with a base and a work supporting carriage longitudinally movable thereon, of yieldable means carried by said base for opposing movement of said carriage each time the latter is moved a predetermined amount on said base.

5. In a machine of the class described, the combination with a base and a work supporting carriage longitudinally movable thereon, and provided with a plurality of spaced notches, of a latch device carried by said base and adapted to coact with said notches to oppose movement of said carriage each time the latter is moved the distance separating one notch from another.

6. In a machine of the class described, the combination with a base and work supporting carriage longitudinally movable thereon, and provided with a plurality of spaced notches, of a yieldable locking pin carried by said base and adapted to enter said notches to limit movement of said carriage on said base.

7. In a machine of the class described, a movable work supporting carriage comprising a longitudinal side member provided with a series of alined sections each independently movable with respect to said side member.

8. In a machine of the class described, a movable work supporting carriage comprising a longitudinal side member provided with a series of alined sections, each yieldably supported on said side member independently of adjacent sections.

9. A work feed comprising a slidable work supporting carriage having side bars between which the work seats, and a series of yieldable work-clamping sections carried by the side bars on the inside thereof to engage opposite side edges of the work.

10. A work feed comprising a slidable work-supporting carriage having side bars which are adjustable to vary the spacing therebetween and between which the work seats, and a series of work clamping sections carried by the side bars on the inside thereof to engage opposite side edges of the work.

11. In a machine of the class described, a movable work supporting carriage comprising a pair of longitudinal side members adjustable with respect to each other and each provided with a series of alined yieldable sections for engaging opposite edges of the work.

In testimony whereof I affix my signature.

BRUNO E. BALDUF.